(12) United States Patent
Pech et al.

(10) Patent No.: US 8,747,794 B2
(45) Date of Patent: Jun. 10, 2014

(54) POLYCRYSTALLINE SILICON AND METHOD FOR PRODUCTION THEREOF

(75) Inventors: Reiner Pech, Neuoetting (DE); Erich Dornberger, Burghausen (DE)

(73) Assignee: Wacker Chemie AG, Munich (DE)

( * ) Notice: Subject to any disclaimer, the term of this patent is extended or adjusted under 35 U.S.C. 154(b) by 133 days.

(21) Appl. No.: 13/197,997

(22) Filed: Aug. 4, 2011

(65) Prior Publication Data

US 2012/0052297 A1    Mar. 1, 2012

(30) Foreign Application Priority Data

Aug. 25, 2010    (DE) .................. 10 2010 039 752

(51) Int. Cl.
*C01B 33/02*    (2006.01)
*C01B 33/037*   (2006.01)
*B02C 19/18*    (2006.01)
*B07B 9/02*     (2006.01)

(52) U.S. Cl.
USPC .............. 423/348; 209/19; 209/21; 241/24.1; 241/24.25; 241/30

(58) Field of Classification Search
CPC .......... C30B 28/00; C30B 28/02; C30B 29/06
USPC .................. 428/403–407; 423/348; 241/24.1, 241/24.25, 30; 209/19, 21
See application file for complete search history.

(56) References Cited

U.S. PATENT DOCUMENTS

| | | | | |
|---|---|---|---|---|
| 4,871,117 A | * | 10/1989 | Baueregger et al. | ............ 241/23 |
| 6,040,544 A | * | 3/2000 | Schantz et al. | ................ 209/577 |
| 6,287,528 B1 | * | 9/2001 | Weber | ........................ 423/215.5 |
| 6,916,657 B2 | | 7/2005 | Hori et al. | |
| 2003/0159647 A1 | | 8/2003 | Arvidson et al. | |
| 2004/0035960 A1 | | 2/2004 | Graham | |
| 2004/0251333 A1 | | 12/2004 | Graham | |
| 2006/0070569 A1 | * | 4/2006 | Andrejewski et al. | .......... 117/13 |
| 2007/0040056 A1 | | 2/2007 | Weidhaus | |
| 2007/0235574 A1 | * | 10/2007 | Schaefer et al. | ................ 241/36 |
| 2008/0006293 A1 | | 1/2008 | Wochner et al. | |
| 2010/0001106 A1 | | 1/2010 | Schaefer et al. | |
| 2011/0068206 A1 | * | 3/2011 | Kondou | ........................ 241/283 |

FOREIGN PATENT DOCUMENTS

| | | |
|---|---|---|
| DE | 10 2006 035 081 A1 | 1/2008 |
| EP | 1338682 A2 | 8/2003 |
| EP | 1754539 A1 | 2/2007 |
| EP | 1876143 A1 | 1/2008 |
| JP | 2004091321 A2 | 3/2004 |
| WO | WO 2009/003688 A2 | 1/2009 |

OTHER PUBLICATIONS

SELFRAG brochure, 2000-2009.*
Crossmann et al., "Highly Pure Silicon Dust as a Contamination Source", Cleanroom technology, pp. 30-31 (2006).

* cited by examiner

*Primary Examiner* — Hoa (Holly) Le
(74) *Attorney, Agent, or Firm* — Caesar, Rivise, Bernstein, Cohen & Pokotilow, Ltd.

(57)    ABSTRACT

Polycrystalline silicon of the invention contains: (a) polycrystalline silicon fragments, wherein at least 90% of the fragments have a size from 10 to 40 mm, (b) <15 ppmw of silicon dust particles having particle sizes <400 µm; (c) <14 ppmw of silicon dust particles having particle sizes <50 µm; (d) <10 ppmw of silicon dust particles having particle sizes <10 µm; (e) <3 ppmw of silicon dust particles having particle sizes <1 µm; and (f) surface metal impurities in an amount ≤0.1 ppbw and ≥100 ppbw. A polycrystalline silicon production method of the invention includes fracturing polycrystalline silicon deposited on thin rods in a Siemens reactor into fragments; classifying the fragments by size; and treating the fragments with compressed air or dry ice to remove silicon dust from the fragments without wet chemical cleaning.

10 Claims, No Drawings

POLYCRYSTALLINE SILICON AND METHOD FOR PRODUCTION THEREOF

BACKGROUND OF THE INVENTION

The present invention relates to polycrystalline silicon and to a method for production thereof.

Polycrystalline silicon, abbreviated to polysilicon, is nowadays industrially produced in large amounts and is used inter alia as a raw material for applications in photovoltaics and for the production of single crystals by wafer manufacturers. In all applications, high purity of the raw material is desired.

In the production of polysilicon, after the vapor deposition it is necessary to break the polysilicon rods into small pieces for further processing. During this, however, the highly pure silicon is contaminated to a greater or lesser extent with extraneous atoms owing to the use of breaking tools. Furthermore, silicon dust particles are formed and adhere to the fragments.

Conventionally, the silicon fragments are purified for higher-quality application fields, for example pulling single crystals, before further processing and/or packaging. This is done according to the prior art in one or more wet chemical cleaning steps. Mixtures of various chemicals and/or acids are used for this, particularly in order to remove adhering extraneous atoms from the surface. These methods, however, are laborious and expensive.

It is known from U.S. Pat. No. 6,916,657 that extraneous particles or extraneous atoms can reduce the yield when pulling crystals. The adhering silicon dust can also have a detrimental effect in this regard.

A method for the determination of silicon dust on polysilicon is known from the journal "Reinraumtechnik" [Cleanroom technology] (January 2006, "Hochreiner Silziumstaub als Kontaminationsquelle" [Highly pure silicon dust as a contamination source]; Reinraumtechnik January 2006, Ivo Cröβmann). This mentions its detrimental effect during further processing to form single crystals. It is disclosed that wet-chemically cleaned polysilicon has "dust" values of about 10 ppmw and after transport up to 60 ppmw with a dust particle size distribution of less than 5 µm.

A method for preparing surface-contaminated silicon material present in a material mixture and having surface contamination of from 1 ppb to 1000 ppm expressed in terms of the weight of silicon, by screening the material adhering to the surface, is known from WO-2009/09003688. The screening does not, however, lead to a reduction of adhering Si dust smaller than about 50 µm, but rather predominantly only separation of loose and sizeable particles.

A method for preparing silicon fragments, in which a dust removal system is intended to free the silicon pieces from dust by means of an air flow through a perforated plate, is known from US 2003/0159647 A1. Low dust values are reported, but without entering into details.

Dust removal by an air flow is not however very efficient, in particular for small Si particles (<50 µm) adhering strongly to the surface. Small Si fragments can escape from the airflow. In the worst case, the strong movement of the polysilicon fragments in the fluidized bed can even lead to an increased number of particles.

It was an object of the present invention to provide economical polycrystalline silicon having a low surface dust content.

SUMMARY OF THE INVENTION

The object of the invention is achieved by polycrystalline silicon of a first fraction size, containing polycrystalline silicon fragments, at least 90% of the fragments having a size from 10 to 40 mm, characterized by silicon dust particle contents of less than 15 ppmw for particle sizes of less than 400 µm, less than 14 ppmw for particle sizes of less than 50 µm, less than 10 ppmw for particle sizes of less than 10 µm and less than 3 ppmw for particle sizes of less than 1 µm, and furthermore characterized by surface metal impurities greater than or equal to 0.1 ppbw and less than or equal to 100 ppbw.

Preferably, in that polycrystalline silicon of a first fraction size, the silicon dust particle content for particle sizes of less than 400 µm is less than 10 ppmw. More particularly preferably, the silicon dust particle content for particle sizes of less than 400 µm is less than 5 ppmw.

Preferably, the silicon dust particle content for particle sizes of less than 50 µm is less than 10 ppmw. More particularly preferably, the silicon dust particle content for particle sizes of less than 50 µm is less than 3 ppmw.

Preferably, the silicon dust particle content for particle sizes of less than 10 µm is less than 5 ppmw. More particularly preferably, the silicon dust particle content for particle sizes of less than 10 µm is less than 1 ppmw.

Preferably, the silicon dust particle content for particle sizes of less than 1 µm is less than 1 ppmw. More particularly preferably, the silicon dust particle content for particle sizes of less than 1 µm is less than 0.1 ppmw.

The aforementioned preferred and more particularly preferred silicon dust particle contents of the polycrystalline silicon according to the invention of a first fraction size are preferably combined with the following preferred surface metal impurities:

Preferably, the surface metal impurities are greater than or equal to 2.5 ppbw and less than or equal to 100 ppbw.

Preferably, the surface metal impurities are greater than or equal to 0.6 ppbw and less than or equal to 2.5 ppbw.

Preferably, the surface metal impurities are greater than or equal to 0.1 ppbw and less than or equal to 0.6 ppbw.

The metals of the surface impurities of the polycrystalline silicon according to the invention preferably belong to the group consisting of Fe, Cr, Ni, Na, Zn, Al, Cu, Mg, Ti, W, K, Co and Ca. Other metals, such as Mn and Ag, are present in negligibly small concentrations.

Preferably, the surface iron impurities are greater than or equal to 0.01 ppbw and less than or equal to 50 ppbw. Preferably, the surface iron impurities are greater than or equal to 0.5 ppbw and less than or equal to 50 ppbw. Preferably, the surface iron impurities are greater than or equal to 0.1 ppbw and less than or equal to 0.5 ppbw. Preferably, the surface iron impurities are greater than or equal to 0.01 ppbw and less than or equal to 0.1 ppbw.

Preferably, the surface tungsten impurities are greater than or equal to 0.01 ppbw and less than or equal to 50 ppbw. Preferably, the surface tungsten impurities are greater than or equal to 1 ppbw and less than or equal to 50 ppbw. Preferably, the surface tungsten impurities are greater than or equal to 0.1 ppbw and less than or equal to 1 ppbw. Preferably, the surface tungsten impurities are greater than or equal to 0.01 ppbw and less than or equal to 0.1 ppbw.

The object of the invention is furthermore achieved by polycrystalline silicon of a second fraction size, containing polycrystalline silicon fragments, at least 90% of the fragments having a size from 20 to 60 mm, characterized by silicon dust particle contents of less than 15 ppmw for particle sizes of less than 400 µm, less than 14 ppmw for particle sizes of less than 50 µm, less than 10 ppmw for particle sizes of less than 10 µm and less than 3 ppmw for particle sizes of less than 1 μm, and furthermore characterized by surface metal impurities greater than or equal to 0.1 ppbw and less than or equal to 100 ppbw.

Preferably, the silicon dust particle content in the polycrystalline silicon of this second fraction size for particle sizes of less than 400 μm is less than 10 ppmw. More particularly preferably, the silicon dust particle content for particle sizes of less than 400 μm is less than 5 ppmw.

Preferably, the silicon dust particle content for particle sizes of less than 50 μm is less than 10 ppmw. More particularly preferably, the silicon dust particle content for particle sizes of less than 50 μm is less than 3 ppmw.

Preferably, the silicon dust particle content for particle sizes of less than 10 μm is less than 5 ppmw. More particularly preferably, the silicon dust particle content for particle sizes of less than 10 μm is less than 1 ppmw.

Preferably, the silicon dust particle content for particle sizes of less than 1 μm is less than 1 ppmw. More particularly preferably, the silicon dust particle content for particle sizes of less than 1 μm is less than 0.1 ppmw.

The aforementioned preferred and more particularly preferred silicon dust particle contents of the polycrystalline silicon according to the invention of a second fraction size are preferably combined with the following preferred surface metal impurities:

Preferably, the surface metal impurities are greater than or equal to 2.0 ppbw and less than or equal to 100 ppbw. Preferably, the surface metal impurities are greater than or equal to 0.5 ppbw and less than or equal to 2.0 ppbw. Preferably, the surface metal impurities are greater than or equal to 0.1 ppbw and less than or equal to 0.5 ppbw.

The metals of the surface impurities of the polycrystalline silicon according to the invention preferably belong to the group consisting of Fe, Cr, Ni, Na, Zn, Al, Cu, Mg, Ti, W, K, Co and Ca. Other metals, such as Mn and Ag, are present in negligibly small concentrations.

Preferably, the surface iron impurities are greater than or equal to 0.01 ppbw and less than or equal to 50 ppbw. Preferably, the surface iron impurities are greater than or equal to 0.5 ppbw and less than or equal to 50 ppbw. Preferably, the surface iron impurities are greater than or equal to 0.1 ppbw and less than or equal to 0.5 ppbw. Preferably, the surface iron impurities are greater than or equal to 0.01 ppbw and less than or equal to 0.1 ppbw.

Preferably, the surface tungsten impurities are greater than or equal to 0.01 ppbw and less than or equal to 50 ppbw. Preferably, the surface tungsten impurities are greater than or equal to 1 ppbw and less than or equal to 50 ppbw. Preferably, the surface tungsten impurities are greater than or equal to 0.1 ppbw and less than or equal to 1 ppbw. Preferably, the surface tungsten impurities are greater than or equal to 0.01 ppbw and less than or equal to 0.1 ppbw.

The object of the invention is furthermore achieved by polycrystalline silicon of a third fraction size, containing polycrystalline silicon fragments, at least 90% of the fragments having a size greater than 45 mm, characterized by silicon dust particle contents of less than 15 ppmw for particle sizes of less than 400 μm, less than 14 ppmw for particle sizes of less than 50 μm, less than 10 ppmw for particle sizes of less than 10 μm and less than 3 ppmw for particle sizes of less than 1 μm, and furthermore characterized by surface metal impurities greater than or equal to 0.1 ppbw and less than or equal to 100 ppbw.

Preferably, the silicon dust particle content in the polycrystalline silicon of this third fraction size for particle sizes of less than 400 μm is less than 10 ppmw. More particularly preferably, the silicon dust particle content for particle sizes of less than 400 μm is less than 5 ppmw.

Preferably, the silicon dust particle content for particle sizes of less than 50 μm is less than 10 ppmw. More particularly preferably, the silicon dust particle content for particle sizes of less than 50 μm is less than 3 ppmw.

Preferably, the silicon dust particle content for particle sizes of less than 10 μm is less than 5 ppmw. More particularly preferably, the silicon dust particle content for particle sizes of less than 10 μm is less than 1 ppmw.

Preferably, the silicon dust particle content for particle sizes of less than 1 μm is less than 1 ppmw. More particularly preferably, the silicon dust particle content for particle sizes of less than 1 μm is less than 0.1 ppmw.

The aforementioned preferred and more particularly preferred silicon dust particle contents of the polycrystalline silicon according to the invention of a third fraction size are preferably combined with the following preferred surface metal impurities:

Preferably, the surface metal impurities are greater than or equal to 1.5 ppbw and less than or equal to 100 ppbw. Preferably, the surface metal impurities are greater than or equal to 0.2 ppbw and less than or equal to 1.5 ppbw. Preferably, the surface metal impurities are greater than or equal to 0.1 ppbw and less than or equal to 0.2 ppbw.

The metals of the surface impurities of the polycrystalline silicon according to the invention preferably belong to the group consisting of Fe, Cr, Ni, Na, Zn, Al, Cu, Mg, Ti, W, K, Co and Ca. Other metals, such as Mn and Ag, are present in negligibly small concentrations.

Preferably, the surface iron impurities are greater than or equal to 0.01 ppbw and less than or equal to 10 ppbw. Preferably, the surface iron impurities are greater than or equal to 0.5 ppbw and less than or equal to 10 ppbw. Preferably, the surface iron impurities are greater than or equal to 0.05 ppbw and less than or equal to 0.5 ppbw. Preferably, the surface iron impurities are greater than or equal to 0.01 ppbw and less than or equal to 0.05 ppbw.

Preferably, the surface tungsten impurities are greater than or equal to 0.01 ppbw and less than or equal to 50 ppbw. Preferably, the surface tungsten impurities are greater than or equal to 0.5 ppbw and less than or equal to 50 ppbw. Preferably, the surface tungsten impurities are greater than or equal to 0.05 ppbw and less than or equal to 0.5 ppbw. Preferably, the surface tungsten impurities are greater than or equal to 0.01 ppbw and less than or equal to 0.05 ppbw.

The object of the invention is furthermore achieved by polycrystalline silicon of a fourth fraction size, containing polycrystalline silicon fragments, at least 90% of the fragments having a size from 3 to 15 mm, characterized by silicon dust particle contents of less than 45 ppmw for particle sizes of less than 400 μm, less than 30 ppmw for particle sizes of less than 50 μm, less than 20 ppmw for particle sizes of less than 10 μm and less than 10 ppmw for particle sizes of less than 1 μm, and furthermore characterized by surface metal impurities greater than or equal to 0.1 ppbw and less than or equal to 1 ppmw.

Preferably, the silicon dust particle content in the polycrystalline silicon of this fourth fraction size for particle sizes of less than 400 μm is less than 30 ppmw. More particularly preferably, the silicon dust particle content for particle sizes of less than 400 μm is less than 15 ppmw.

Preferably, the silicon dust particle content for particle sizes of less than 50 μm is less than 20 ppmw.

More particularly preferably, the silicon dust particle content for particle sizes of less than 50 μm is less than 10 ppmw.

Preferably, the silicon dust particle content for particle sizes of less than 10 µm is less than 15 ppmw. More particularly preferably, the silicon dust particle content for particle sizes of less than 10 µm is less than 6 ppmw.

Preferably, the silicon dust particle content for particle sizes of less than 1 µm is less than 5 ppmw. More particularly preferably, the silicon dust particle content for particle sizes of less than 1 µm is less than 0.5 ppmw.

The aforementioned preferred and more particularly preferred silicon dust particle contents of the polycrystalline silicon according to the invention of a fourth fraction size are preferably combined with the following preferred surface metal impurities:

Preferably, the surface metal impurities are greater than or equal to 10 ppbw and less than or equal to 1 ppmw. Preferably, the surface metal impurities are greater than or equal to 4.5 ppbw and less than or equal to 10 ppbw. Preferably, the surface metal impurities are greater than or equal to 0.1 ppbw and less than or equal to 4.5 ppbw.

The metals of the surface impurities of the polycrystalline silicon according to the invention preferably belong to the group consisting of Fe, Cr, Ni, Na, Zn, Al, Cu, Mg, Ti, W, K, Co and Ca. Other metals, such as Mn and Ag, are present in negligibly small concentrations.

Preferably, the surface iron impurities are greater than or equal to 0.01 ppbw and less than or equal to 500 ppbw. Preferably, the surface iron impurities are greater than or equal to 1.0 ppbw and less than or equal to 500 ppbw. Preferably, the surface iron impurities are greater than or equal to 0.3 ppbw and less than or equal to 1.0 ppbw. Preferably, the surface iron impurities are greater than or equal to 0.01 ppbw and less than or equal to 0.3 ppbw.

Preferably, the surface tungsten impurities are greater than or equal to 0.01 ppbw and less than or equal to 500 ppbw. Preferably, the surface tungsten impurities are greater than or equal to 10 ppbw and less than or equal to 500 ppbw. Preferably, the surface tungsten impurities are greater than or equal to 1 ppbw and less than or equal to 10 ppbw. Preferably, the surface tungsten impurities are greater than or equal to 0.01 ppbw and less than or equal to 1 ppbw.

The object of the invention is furthermore achieved by polycrystalline silicon of a fifth fraction size, containing polycrystalline silicon fragments, at least 90% of the fragments having a size from 0.5 to 5 mm, characterized by silicon dust particle contents of less than 70 ppmw for particle sizes of less than 400 µm, less than 62 ppmw for particle sizes of less than 50 µm, less than 60 ppmw for particle sizes of less than 10 µm and less than 40 ppmw for particle sizes of less than 1 µm, and furthermore characterized by surface metal impurities greater than or equal to 0.1 ppbw and less than or equal to 10 ppmw.

Preferably, the silicon dust particle content in the polycrystalline silicon of this fifth fraction size for particle sizes of less than 400 µm is less than 40 ppmw. More particularly preferably, the silicon dust particle content for particle sizes of less than 400 µm is less than 20 ppmw.

Preferably, the silicon dust particle content for particle sizes of less than 50 µm is less than 30 ppmw. More particularly preferably, the silicon dust particle content for particle sizes of less than 50 µm is less than 15 ppmw.

Preferably, the silicon dust particle content for particle sizes of less than 10 µm is less than 25 ppmw. More particularly preferably, the silicon dust particle content for particle sizes of less than 10 µm is less than 12 ppmw.

Preferably, the silicon dust particle content for particle sizes of less than 1 µm is less than 10 ppmw. More particularly preferably, the silicon dust particle content for particle sizes of less than 1 µm is less than 1 ppmw.

The aforementioned preferred and more particularly preferred silicon dust particle contents of the polycrystalline silicon according to the invention of a fifth fraction size are preferably combined with the following preferred surface metal impurities:

Preferably, the surface metal impurities are greater than or equal to 100 ppbw and less than or equal to 10 ppmw. Preferably, the surface metal impurities are greater than or equal to 20 ppbw and less than or equal to 100 ppbw. Preferably, the surface metal impurities are greater than or equal to 0.1 ppbw and less than or equal to 20 ppbw.

The metals of the surface impurities of the polycrystalline silicon according to the invention preferably belong to the group consisting of Fe, Cr, Ni, Na, Zn, Al, Cu, Mg, Ti, W, K, Co and Ca. Other metals, such as Mn and Ag, are present in negligibly small concentrations.

Preferably, the surface iron impurities are greater than or equal to 0.01 ppbw and less than or equal to 1 ppmw. Preferably, the surface iron impurities are greater than or equal to 5.0 ppbw and less than or equal to 1000 ppbw. Preferably, the surface iron impurities are greater than or equal to 1.0 ppbw and less than or equal to 5.0 ppbw. Preferably, the surface iron impurities are greater than or equal to 0.01 ppbw and less than or equal to 1.0 ppbw.

Preferably, the surface tungsten impurities are greater than or equal to 0.01 ppbw and less than or equal to 5 ppmw. Preferably, the surface tungsten impurities are greater than or equal to 100 ppbw and less than or equal to 5 ppmw. Preferably, the surface tungsten impurities are greater than or equal to 10 ppbw and less than or equal to 100 ppbw. Preferably, the surface tungsten impurities are greater than or equal to 0.01 ppbw and less than or equal to 10 ppbw.

The polycrystalline silicon according to all the fraction sizes mentioned above is imparted with these properties in respect of surface dust and metal contaminations without any wet chemical treatment. This does not mean that a wet chemical treatment might not be advantageous in the subsequent process steps, in order for example to achieve even lower metal contaminations or in order to subject the polycrystalline silicon to a surface etching treatment.

The low dust particle content results from a particular dust removal method, which will be explained in more detail below. The metal values in all claimed and preferred ranges are achieved by using low-contamination processing, in particular when breaking the silicon into fragments, and by selecting a suitable cleanroom class.

For particularly demanding applications, particularly low-contamination processing is therefore combined with a low cleanroom class (according to US FED STD 209E, superseded by ISO 14644-1), for example with cleanroom class 100. In the class 100 (ISO 5), at most 3.5 particles with a maximum diameter of 0.5 µm may be contained per liter.

The preferred ranges for surface metal impurities mentioned for the various fraction sizes, and the ranges for contamination with iron and tungsten, correspond to lower and upper ranges of the claimed ranges.

The lower ranges require low-contamination processing. This polycrystalline silicon is suitable for particularly demanding applications in which low contamination with metals is desired.

Preferably, the upper and lower ranges for metal, iron and tungsten contamination are combined together for all fraction sizes mentioned.

Thus, for example, the following metal contaminations are particularly preferred for polycrystalline silicon of a third fraction size:

For demanding applications:
Total metals 0.1 ppbw to 0.2 ppbw,
Iron 0.01 ppbw to 0.05 ppbw,
Tungsten 0.01 ppbw to 0.05 ppbw.

For less demanding applications:
Total metals 0.2 ppbw to 1.5 ppbw,
Iron 0.05 ppbw to 0.5 ppbw,
Tungsten 0.05 ppbw to 0.5 ppbw.

The invention is also achieved by a method for the production of polycrystalline silicon, comprising fracture of polycrystalline silicon deposited on thin rods in a Siemens reactor into fragments, sorting of the fragments into size classes of from about 0.5 mm to more than 45 mm, and treatment of the silicon fragments by means of compressed air or dry ice in order to remove silicon dust from the fragments, no wet chemical cleaning of the fragments being carried out.

Lastly, the invention is also achieved by a second method according to the invention for removing dust from polycrystalline silicon which is provided in the form of granules or in the form of rods, rod pieces or fragments, by means of compressed air or dry ice without any wet chemical treatment, in order to remove silicon dust from the polycrystalline silicon.

Preferably, in both methods according to the invention, the silicon is broken into fragments with a low-contamination tool.

DETAILED DESCRIPTION OF PREFERRED EMBODIMENTS

In the prior art, it has hitherto been customary to clean the polycrystalline silicon fragments chemically in order to achieve acceptable metal and particle levels, when they are intended for uses in semiconductor technology.

The Inventors have shown that even unpurified polysilicon, which actually has too high a metal particle level, is nevertheless suitable even for demanding applications in semiconductor technology when it is previously dedusted.

This is surprising in so far as metal impurities and other extraneous particles in polysilicon fragments have been regarded as one of the main causes of dislocations when pulling single crystals. Polysilicon without wet chemical treatment has x-fold higher metal contamination than wet-chemically treated polysilicon. As disclosed above, depending on the fraction size this lies between 0.1 ppbw and 10 000 ppbw. The prevailing opinion assumed that the metal impurities could only be at most 100 pptw in order not to lead to problems during the crystal pull. Now, however, it has been found that silicon dust plays an even more important role. Dedusted, unpurified polysilicon exhibits outstanding properties during pulling processes, despite the comparatively high metal contamination.

It has furthermore been found that chemically cleaned polysilicon having a low metal level of less than 100 pptw, which has been subjected to dust removal by means of compressed air or dry ice and has a reduced silicon particle level below the detection limit of about 1 ppmw, shows a significantly better pulling performance for high-quality applications (for example single crystal pulling for semiconductor applications and demanding solar applications).

Not enough attention was paid in the prior art to the effects of the dust adhering on the silicon, particularly in the form of silicon particles with sizes of from a few µm to several 100 µm.

The Inventors have established that the polycrystalline silicon according to the invention also leads to better results in the block casting of silicon for solar applications.

This applies irrespective of the fraction size, which is defined as follows below respectively as the greatest distance between two points on the surface of a silicon fragment (=max. length):

Fraction size 0 (FS1) in mm: about 0.5 to 5
Fraction size 1 (FS1) in mm: about 3 to 15
Fraction size 2 (FS2) in mm: about 10 to 40
Fraction size 3 (FS3) in mm: about 20 to 60
Fraction size 4 (FS4) in mm: about >45

In each case, at least about 90 wt % of the fraction lies within the stated size range.

The polysilicon is preferably broken with low contamination.

In order to achieve particularly low metal values, all system parts in the breaker and the screening apparatus which touch the product are preferably made using low-contamination materials such as plastics or silicon or other wear-resistant materials such as ceramics, quartz or hard metals.

Furthermore, operation is preferably carried out in cleanroom classes of less than 1000, particularly preferably less than 100 and more particularly preferably less than 10.

The removal of dust from the polysilicon broken in a low-contamination fashion is carried out by means of compressed air and/or dry ice.

The silicon fragments may be arranged randomly during the dust removal or repositioned.

The dust removal may be carried out with all technically conventional pressures and various nozzle arrangements and numbers of nozzles.

The dust removal may be carried out at one or more points in the process chain, i.e. for example immediately after the breaking and/or after the classification and/or shortly before packaging or even after transport, for example just before the crucible apparatus.

For effective blowing of the silicon surface, commercially available compressed air guns may also be used. These compressed air guns are preferably made of low-contamination materials, particularly preferably stainless steel, hard metals or plastic (PU, PP or PE).

Air, carbon dioxide or other inert gases, for example nitrogen or argon, may be used as compressed air. Any desired gas mixtures may also be envisaged, or alternatively gas additives with an extra chemical cleaning effect, for example ozone.

Dust removal with gas pressures of from 1 to 20 bar, preferably from 5 to 10 bar, is preferably used during the production of polysilicon according to the invention. For small fraction sizes, operation will tend to be carried out with lower pressures.

The surface of the silicon fragments is in this case blown with a gas speed of at least 2 m/s, preferably greater than 10 m/s and particularly preferably greater than 100 m/s.

The action of the gas jet on the silicon surface may involve one or more short pulses of less than one second, or a continuous jet lasting several seconds or minutes.

So that no contamination by extraneous particles takes place, operation is preferably carried out with dry (dew point <40° C.), oil- and grease-free purified gases, and particularly preferably with semiconductor quality gases, i.e. with an extraneous atom content of less than 10 ppm, preferably less than 1 ppm and particularly preferably less than 0.1 ppm, expressed in terms of the volume.

Particularly good results are achieved when the air is additionally purified as close as possible to the air outlet with a particle filter smaller than 10 µm, preferably smaller than 0.1 µm and particularly preferably smaller than 0.001 µm.

Depending on the fraction size of the silicon pieces to be cleaned and the extent of the dust contamination of the surface, commercially available high-pressure cleaners with rotating or pulsating nozzles and with different nozzle shapes may be envisaged.

In another preferred embodiment, the material to be cleaned is conveyed on a vibrating trough or by means of a conveyor belt, preferably comprising a dust-permeable screening fabric having a mesh width somewhat smaller than the fraction size. Both a large high-powered nozzle and a plurality of small nozzles in various positions, configurations and orientations with respect to the Si pieces over these conveyor units are possible.

An automated change of the orientation of the silicon material by means of one or more turning devices is particularly preferred.

The dedusting of the silicon fragments is particularly preferably carried out by means of dry ice.

Dry ice cleaning removes particles adhering on a surface by blowing prepared $CO_2$ in the form of dry ice particles through high-speed nozzles. Extraneous particles and silicon dust particles are detached from the silicon fragments by a combination of kinetic energy, thermal shock action and a sublimation effect.

Surprisingly, it has been found that commercially available cleaning apparatus (for example from the company Cold Jet) can be used for this if they are equipped with low-contamination materials.

A plastic lining is preferably used for the dry ice storage container (for example PU, PP or PE).

If the apparatus is operated with blocks of dry ice, then a processing tool made of wear-resistant ceramic or hard metal is preferably used to produce the cold ice particles at a temperature of about minus 80° C.

So that no contamination by extraneous particles takes place, ultrapure dry ice is used, for example based on food quality carbon dioxide gas.

The dry ice particles are accelerated with the aid of purified gases (filtered compressed air, $CO_2$, inert gases such as semiconductor quality nitrogen, or mixtures thereof) at a pressure of from 1 to 20 bar, preferably from 3 to 10 bar in a "low-contamination" Venturi nozzle and blown therefrom onto the silicon surface to be cleaned with a speed greater than 2 m/s, preferably greater than 10 m/s, particularly preferably greater than 100 m/s.

The dry ice cleaning thus leaves no residues behind on the polysilicon. The material furthermore remains dry. Laborious drying as in the wet chemical method is not necessary.

The ice consumption varies according to the nozzle configuration and pressure range.

Another preferred embodiment consists in combining dust removal by means of compressed air and dust removal by means of dry ice.

By using the production method according to the invention, significant costs can be reduced in production since, for example, it is even possible to use breaking and sorting apparatus which produce a great deal of dust.

The method according to the invention is also not limited to compact or porous fragments of polysilicon, but may also be used to remove dust from other polysilicon products, for example granules or so-called cut rods or float-zone/Czochralski rods.

The invention will now be explained in more detail with the aid of examples and comparative examples.

EXAMPLES

A plurality of polycrystalline silicon rods were broken into fragments of different size using a breaker and classified. The fine material was separated by means of screening.

In order to achieve particularly low metal values, all system parts in the breaker and the classifying apparatus which touch the product were made using low-contamination materials such as plastics or silicon or other wear-resistant materials such as ceramics, quartz or hard metals.

The material was broken to the target size of fraction size 4, although fragments of all other sizes were also formed.

Subsequently, a plurality of samples was taken randomly from the various classified fragment size fractions and dust and metals adhering thereon were measured.

For the determination of adhering silicon particles, a plurality of fragments with a weight of more than 100 g were taken and put into a clean screening tube (mesh width 160 μm), and the particles were separated in a water bath. The number and size of the particles in the water bath were then determined with respect to the weighed-in silicon samples by means of laser diffraction, using a Beckman Coulter LS 13320.

For determination of the surface metals, a plurality of sample pieces were likewise taken randomly and the metal contamination was determined by chemical stripping of the silicon surface and subsequent analysis of the stripped solution by ICPMS.

The results are presented in Tables 1 to 4.

High dust values are found, particularly for small fraction sizes.

The metal values, on the other hand, are at a medium level, which results from the low-contamination processing.

Table 1 shows the dust values for fraction size 4.

The concentrations in ppmw are respectively presented for various maximum observed particle sizes.

TABLE 1

| Fraction size 4 - dust [ppmw] | | | | | |
|---|---|---|---|---|---|
| Particle size <1 μm | Particle size <5 μm | Particle size <10 μm | Particle size <20 μm | Particle size <50 μm | Particle size <400 μm |
| 1 | 2 | 2 | 2 | 2 | 2 |
| 2 | 6 | 9 | 11 | 14 | 14 |
| 1 | 4 | 5 | 7 | 10 | 11 |
| 1 | 3 | 5 | 8 | 11 | 12 |
| 1 | 4 | 5 | 8 | 11 | 13 |
| 2 | 4 | 6 | 9 | 13 | 17 |
| 2 | 4 | 6 | 8 | 13 | 18 |
| 1 | 3 | 5 | 6 | 9 | 13 |
| 2 | 4 | 6 | 8 | 12 | 17 |
| 2 | 5 | 7 | 9 | 15 | 19 |
| 1 | 4 | 5 | 7 | 11 | 14 |
| 1 | 3 | 5 | 7 | 10 | 14 |
| 1 | 4 | 5 | 7 | 10 | 14 |
| 1 | 3 | 4 | 6 | 7 | 9 |
| 1 | 3 | 4 | 6 | 9 | 13 |
| 2 | 4 | 6 | 9 | 18 | 28 |

Table 2 shows the dust values for fraction size 3 in ppmw.

The concentrations in ppmw are respectively presented for various maximum observed particle sizes.

TABLE 2

| Fraction size 3 - dust [ppmw] | | | | | |
|---|---|---|---|---|---|
| Particle size <1 μm | Particle size <5 μm | Particle size <10 μm | Particle size <20 μm | Particle size <50 μm | Particle size <400 μm |
| 2 | 3 | 3 | 3 | 3 | 3 |
| 2 | 3 | 3 | 3 | 3 | 3 |
| 3 | 6 | 8 | 9 | 11 | 11 |

TABLE 2-continued

| Fraction size 3 - dust [ppmw] | | | | | |
|---|---|---|---|---|---|
| Particle size <1 μm | Particle size <5 μm | Particle size <10 μm | Particle size <20 μm | Particle size <50 μm | Particle size <400 μm |
| 2 | 6 | 7 | 10 | 13 | 13 |
| 2 | 5 | 7 | 9 | 12 | 14 |
| 4 | 8 | 10 | 12 | 14 | 14 |
| 3 | 8 | 10 | 14 | 19 | 24 |
| 2 | 5 | 6 | 8 | 12 | 16 |
| 2 | 5 | 7 | 8 | 11 | 16 |
| 2 | 6 | 8 | 10 | 14 | 18 |
| 2 | 4 | 6 | 8 | 13 | 20 |
| 3 | 6 | 8 | 10 | 13 | 18 |
| 3 | 6 | 8 | 10 | 14 | 20 |
| 3 | 5 | 7 | 8 | 11 | 15 |
| 3 | 5 | 7 | 9 | 12 | 20 |
| 3 | 5 | 7 | 8 | 10 | 13 |

Table 3 shows the dust values for fraction size 2 in ppmw. The concentrations in ppmw are respectively presented for various maximum observed particle sizes.

TABLE 3

| Fraction size 2 - dust [ppmw] | | | | | |
|---|---|---|---|---|---|
| Particle size <1 μm | Particle size <5 μm | Particle size <10 μm | Particle size <20 μm | Particle size <50 μm | Particle size <400 μm |
| 1 | 3 | 4 | 5 | 5 | 5 |
| 2 | 4 | 6 | 7 | 8 | 8 |
| 2 | 4 | 6 | 7 | 9 | 9 |
| 2 | 5 | 6 | 8 | 9 | 9 |
| 2 | 4 | 6 | 7 | 9 | 10 |
| 2 | 5 | 6 | 8 | 10 | 10 |
| 3 | 4 | 4 | 4 | 4 | 4 |
| 3 | 5 | 5 | 5 | 5 | 5 |
| 4 | 8 | 10 | 11 | 13 | 13 |
| 4 | 9 | 12 | 15 | 18 | 18 |
| 3 | 6 | 7 | 9 | 12 | 13 |
| 4 | 8 | 10 | 13 | 16 | 17 |
| 4 | 8 | 10 | 13 | 18 | 21 |
| 3 | 6 | 7 | 9 | 12 | 13 |
| 3 | 6 | 8 | 10 | 13 | 19 |
| 3 | 6 | 8 | 11 | 18 | 27 |
| 3 | 6 | 8 | 10 | 14 | 18 |
| 2 | 4 | 6 | 8 | 11 | 16 |
| 3 | 6 | 7 | 9 | 11 | 16 |
| 4 | 7 | 8 | 9 | 11 | 15 |
| 3 | 6 | 8 | 10 | 14 | 21 |
| 3 | 7 | 8 | 10 | 14 | 21 |
| 3 | 6 | 8 | 10 | 15 | 21 |
| 4 | 7 | 8 | 10 | 13 | 19 |
| 3 | 6 | 8 | 10 | 13 | 18 |

Table 4 shows the dust values for fraction size 1 in ppmw. The concentrations in ppmw are respectively presented for various maximum observed particle sizes.

TABLE 4

| Fraction size 1 - dust [ppmw] | | | | | |
|---|---|---|---|---|---|
| Particle size <1 μm | Particle size <5 μm | Particle size <10 μm | Particle size <20 μm | Particle size <50 μm | Particle size <400 μm |
| 9 | 15 | 17 | 17 | 17 | 17 |
| 8 | 14 | 16 | 16 | 16 | 16 |
| 7 | 12 | 14 | 17 | 25 | 30 |
| 6 | 11 | 13 | 16 | 25 | 40 |
| 7 | 14 | 17 | 21 | 31 | 47 |
| 8 | 13 | 15 | 18 | 27 | 43 |
| 10 | 15 | 17 | 20 | 26 | 36 |
| 7 | 12 | 15 | 20 | 31 | 56 |
| 9 | 15 | 18 | 23 | 37 | 55 |
| 9 | 15 | 18 | 22 | 29 | 42 |
| 12 | 20 | 23 | 27 | 36 | 50 |
| 7 | 15 | 19 | 25 | 40 | 59 |
| 9 | 20 | 26 | 33 | 53 | 75 |
| 9 | 15 | 18 | 21 | 31 | 47 |

Table 5 shows the dust values for fraction size 0 in ppmw. The concentrations in ppmw are respectively presented for various maximum observed particle sizes.

TABLE 5

| Fraction size 0 - dust [ppmw] | | | | | |
|---|---|---|---|---|---|
| Particle size <1 μm | Particle size <5 μm | Particle size <10 μm | Particle size <20 μm | Particle size <50 μm | Particle size <400 μm |
| 35 | 55 | 59 | 59 | 59 | 59 |
| 36 | 56 | 61 | 61 | 61 | 61 |
| 37 | 58 | 62 | 67 | 75 | 114 |
| 30 | 46 | 49 | 50 | 50 | 50 |
| 34 | 51 | 54 | 57 | 58 | 58 |

Table 6 shows the metal values according to fraction size in pptw.

TABLE 6

| FS4 | Fe | Cr | Ni | Na | Zn | Al | Cu | Mg | Ti | W | K | Ca | Co | Total |
|---|---|---|---|---|---|---|---|---|---|---|---|---|---|---|
| #1 | 384 | 5 | 13 | 7 | 12 | 19 | 1 | 11 | 15 | 105 | 2 | 590 | 53 | 1218 |
| #2 | 53 | 11 | 5 | 3 | 1 | 1 | 1 | 1 | 2 | 60 | 5 | 11 | 52 | 205 |
| #3 | 76 | 16 | 7 | 3 | 1 | 12 | 1 | 6 | 7 | 175 | 5 | 18 | 26 | 352 |
| #4 | 11 | 7 | 3 | 4 | 1 | 7 | 1 | 1 | 1 | 216 | 5 | 26 | 27 | 311 |
| #5 | 127 | 29 | 12 | 4 | 1 | 71 | 1 | 7 | 4 | 397 | 6 | 15 | 51 | 726 |
| Average value | 130 | 14 | 8 | 4 | 3 | 22 | 1 | 5 | 6 | 191 | 5 | 132 | 42 | 562 |
| FS3 | Fe | Cr | Ni | Na | Zn | Al | Cu | Mg | Ti | W | K | Ca | Co | Total |
| #1 | 79 | 12 | 6 | 34 | 15 | 16 | 4 | 5 | 1 | 201 | 7 | 99 | 25 | 506 |
| #2 | 130 | 27 | 14 | 14 | 6 | 60 | 2 | 9 | 3 | 342 | 7 | 519 | 79 | 1212 |

TABLE 6-continued

| | | | | | | | | | | | | | | |
|---|---|---|---|---|---|---|---|---|---|---|---|---|---|---|
| #3 | 248 | 14 | 7 | 16 | 8 | 18 | 1 | 36 | 5 | 185 | 7 | 220 | 38 | 803 |
| #4 | 109 | 17 | 8 | 5 | 4 | 16 | 17 | 3 | 4 | 216 | 3 | 62 | 31 | 495 |
| #5 | 141 | 19 | 8 | 11 | 7 | 12 | 10 | 3 | 3 | 388 | 4 | 29 | 42 | 678 |
| Average value | 142 | 18 | 8 | 16 | 8 | 24 | 7 | 12 | 3 | 267 | 6 | 186 | 43 | 739 |

| FS2 | Fe | Cr | Ni | Na | Zn | Al | Cu | Mg | Ti | W | K | Ca | Co | Total |
|---|---|---|---|---|---|---|---|---|---|---|---|---|---|---|
| #1 | 144 | 16 | 7 | 33 | 7 | 18 | 2 | 2 | 2 | 297 | 11 | 36 | 70 | 645 |
| #2 | 94 | 17 | 7 | 10 | 4 | 21 | 3 | 2 | 3 | 308 | 14 | 59 | 82 | 622 |
| #3 | 91 | 19 | 8 | 8 | 15 | 2 | 1 | 24 | 1 | 478 | 9 | 1013 | 71 | 1740 |
| #4 | 126 | 21 | 12 | 65 | 8 | 18 | 2 | 33 | 3 | 374 | 23 | 1373 | 76 | 2134 |
| #5 | 181 | 15 | 7 | 40 | 14 | 25 | 3 | 20 | 6 | 157 | 19 | 246 | 40 | 771 |
| Average value | 127 | 17 | 8 | 31 | 10 | 17 | 2 | 16 | 3 | 323 | 15 | 545 | 68 | 1183 |

| FS1 | Fe | Cr | Ni | Na | Zn | Al | Cu | Mg | Ti | W | K | Ca | Co | Total |
|---|---|---|---|---|---|---|---|---|---|---|---|---|---|---|
| #1 | 413 | 85 | 38 | 86 | 23 | 11 | 5 | 8 | 27 | 7500 | 713 | 101 | 1037 | 10048 |
| #2 | 368 | 72 | 35 | 22 | 10 | 12 | 5 | 14 | 28 | 6353 | 7 | 137 | 585 | 7647 |
| #3 | 485 | 88 | 40 | 85 | 16 | 21 | 6 | 32 | 32 | 2100 | 797 | 408 | 584 | 4693 |
| #4 | 1002 | 162 | 71 | 82 | 58 | 150 | 13 | 74 | 36 | 5596 | 200 | 855 | 568 | 8865 |
| #5 | 353 | 56 | 26 | 56 | 42 | 71 | 3 | 15 | 19 | 4064 | 90 | 541 | 462 | 5798 |
| Average value | 524 | 93 | 42 | 66 | 30 | 53 | 6 | 29 | 29 | 5122 | 362 | 408 | 647 | 7410 |

| FS0 | Fe | Cr | Ni | Na | Zn | Al | Cu | Mg | Ti | W | K | Ca | Co | Total |
|---|---|---|---|---|---|---|---|---|---|---|---|---|---|---|
| #1 | 1328 | 128 | 40 | 1760 | 2264 | 5 | 48 | 48 | 744 | 18824 | 1160 | 1000 | 2352 | 29701 |
| #2 | 1392 | 46 | 20 | 1538 | 5 | 5 | 46 | 20 | 792 | 23754 | 1077 | 1000 | 3685 | 33381 |
| #3 | 1065 | 8 | 20 | 211 | 68 | 5 | 8 | 20 | 1208 | 64631 | 169 | 1000 | 9330 | 77744 |
| #4 | 1995 | 195 | 75 | 2000 | 1748 | 1500 | 45 | 20 | 998 | 32948 | 675 | 1000 | 4868 | 48065 |
| #5 | 994 | 51 | 20 | 171 | 5 | 5 | 9 | 20 | 1183 | 31911 | 86 | 1000 | 4234 | 39690 |
| Average value | 1355 | 86 | 35 | 1136 | 818 | 304 | 31 | 26 | 985 | 34414 | 633 | 1000 | 4894 | 45716 |

Example 1

The method according to the invention was then applied to the silicon fragments.

A plurality of 100 g fragments having fraction size distributions 0 to 4 were respectively taken and blown according to the invention with dried, oil-free compressed air purified by means of a 0.1 µm particle filter using a commercially available manual nozzle with mechanical repositioning on a plastic screen having a mesh width somewhat smaller than the fraction size (size of the mesh width: preferably about 50% of the lower length limit of the fraction size in question) for from 1 to 10 seconds.

The pressure was about 5 bar, with an air exit speed at the nozzle (cross-sectional opening about 1 mm$^2$) of more than 10 m/s.

The dust contamination and the tungsten concentration were subsequently measured on randomly selected sample pieces.

For all fraction sizes, it was possible to reduce the particle sizes of the adhering dust on average by a factor of more than 2.

The results show with the aid of the monitor element W that a slight reduction of the contamination with surface metals is also achieved. The contamination with metals is basically at the medium level according to Table 6.

However, the dust removal also surprisingly leads to a slight reduction of the metal level, which can be seen with the aid of the monitor element tungsten. 120 pptw were found for tungsten.

Table 7 shows the dust values for all fraction sizes of Example 1 in ppmw.

A significant improvement can be seen.

SEM images (not shown) confirm that the amount of adhering Si particles visible per unit area was reduced.

TABLE 7

| Fraction size | Particle size <1 µm | Particle size <10 µm | Particle size <50 µm | Particle size <400 µm |
|---|---|---|---|---|
| FS0 | 3.0 | 15 | 20 | 22 |
| FS0 | 5.0 | 20 | 22 | 28 |
| FS0 | 1.0 | 5 | 8 | 9 |
| FS0 | 13 | 8 | 10 | 11 |
| FS0 | 4.0 | 12 | 13 | 15 |
| FS1 | 1.0 | 10 | 17 | 26 |
| FS1 | 1.2 | 6 | 10 | 15 |
| FS1 | 0.5 | 4 | 6 | 9 |
| FS1 | 1.5 | 4 | 7 | 11 |
| FS1 | 2.0 | 5 | 8 | 12 |
| FS2 | 0.8 | 1.3 | 1.3 | 1.3 |
| FS2 | 1.0 | 1.3 | 1.3 | 1.3 |
| FS2 | 0.7 | 1.3 | 1.3 | 1.3 |
| FS2 | 1.4 | 0.8 | 0.8 | 0.8 |
| FS2 | 1.5 | 1.7 | 2 | 2 |
| FS2 | | 1.4 | 1.4 | 1.4 |
| FS2 | | 1.3 | 1.3 | 1.3 |
| FS2 | | 0.7 | 0.7 | 0.7 |
| FS2 | | 1.3 | 2 | 2 |
| FS2 | | 4 | 8 | 9 |
| FS2 | | 4 | 7 | 9 |
| FS2 | | 2 | 6 | 11 |
| FS2 | | 3 | 7 | 11 |
| FS2 | | 1.0 | 2 | 4 |
| FS2 | | 2 | 5 | 9 |
| FS3 | 0.7 | 3 | 4 | 4 |
| FS3 | 0.5 | 4 | 6 | 7 |
| FS3 | 0.8 | 0.8 | 3 | 5 |
| FS3 | 1.0 | 1.6 | 4 | 8 |
| FS3 | 1.1 | 2 | 6 | 10 |
| FS3 | | 0.2 | 0.5 | 0.9 |
| FS3 | | 2 | 6 | 9 |
| FS4 | 0.5 | 1.4 | 5 | 6 |
| FS4 | 0.3 | 1.1 | 3 | 4 |
| FS4 | 0.9 | 0.9 | 3 | 5 |

TABLE 7-continued

| Fraction size | Particle size <1 μm | Particle size <10 μm | Particle size <50 μm | Particle size <400 μm |
|---|---|---|---|---|
| FS4 | 0.6 | 1.7 | 5 | 10 |
| FS4 | 0.4 | 1.2 | 4 | 9 |
| FS4 |  | 0.7 | 2 | 3 |

Example 2

The procedure similar to Example 1 was carried out and a plurality of 100 g pieces were taken from each of the various Si fraction size distributions, fraction size 0 to 4, produced in a low-contamination fashion as described above, and dedusted according to the invention by means of dry ice.

A commercially available mobile device from the company ColdJet (of the Aero type) was used for this, with a dry ice throughput rate of about 1 kg/min.

The dry ice has only a few ppta of contamination with metals (Fe, Cr, Ca, etc.).

The polysilicon fragments were subsequently repositioned manually on a PU plastic screen having a mesh width somewhat smaller than the fraction size (size about 50% of the lower length limit of the fraction size in question) by hand and blown using a flat nozzle for from 1 to 10 seconds.

The nozzle had a cross-sectional opening of several cm in length and several mm in width.

The pressure was between 1 and 10 bar, depending on the fraction size, with an air exit speed of more than 10 m/s at the nozzle.

For smaller fraction sizes, dedusting was carried out with reduced power, or pressure, of the device.

The dust contamination and metals were subsequently again measured on randomly selected sample pieces.

It was possible to further slightly improve the metals, again measured with tungsten as the monitor element, relative to the cleaning by means of compressed air.

Furthermore, for all fraction sizes, all particle sizes are reduced by a factor of more than 3 (in comparison with the reference example).

Table 8 shows the dust values in ppmw for all fraction sizes of Example 2.

TABLE 8

| Fraction size | Particle size <1 μm | Particle size <10 μm | Particle size <50 μm | Particle size <400 μm |
|---|---|---|---|---|
| FS0 | 6 | 8 | 17 | 22 |
| FS0 | 2 | 15 | 18 | 20 |
| FS0 | 3 | 2 | 5 | 5 |
| FS0 | 0.5 | 7 | 10 | 11 |
| FS0 | 2 | 12 | 12 | 13 |
| FS1 | 1.0 | 1.5 | 2 | 3 |
| FS1 | 1.4 | 3 | 5 | 7 |
| FS1 | 0 | 3 | 4 | 7 |
| FS1 | 2 | 3 | 7 | 17 |
| FS1 | 2 | 4 | 6 | 13 |
| FS1 |  | 4 | 6 | 9 |
| FS1 |  | 4 | 8 | 9 |
| FS2 | 0.8 | 1.5 | 2 | 4 |
| FS2 | 1.2 | 2 | 3 | 5 |
| FS2 | 0.7 | 1.2 | 2 | 4 |
| FS2 | 1.4 | 3 | 5 | 8 |
| FS2 | 1.3 | 2 | 4 | 7 |
| FS2 |  | 2 | 2 | 4 |
| FS3 | 0.7 | 3 | 6 | 10 |
| FS3 | 0.3 | 0.9 | 3 | 4 |
| FS3 | 0.8 | 0.7 | 3 | 6 |
| FS3 | 0.3 | 2 | 7 | 12 |
| FS3 | 1.1 |  |  |  |
| FS4 | 0.5 | 1.2 | 4 | 6 |
| FS4 | 0.3 | 0.5 | 1.3 | 2 |
| FS4 | 0.7 | 1.0 | 3 | 4 |
| FS4 | 0.6 | 1.7 | 6 | 9 |
| FS4 | 0.2 | 1.1 | 4 | 7 |

The contamination with metals is at a medium level.

Table 9 shows the tungsten concentrations for Example 1 (compressed air), Example 2 (dry ice) and as a reference the values after low-contamination processing but without dust removal, cf. Table 6, respectively in pptw.

Tungsten is represented separately for comparison since cross-contamination by the environment and handling can be excluded here.

TABLE 9

| FS4 | Reference | Compressed air | Dry ice |
|---|---|---|---|
| Tungsten [pptw] | 105 | 51 | 36 |
|  | 60 | 61 | 40 |
|  | 175 | 116 | 56 |
|  | 216 | 106 | 44 |
|  | 397 | 266 | 254 |
| Average | 191 | 120 | 86 |

Comparative Example

In the comparative example, by means of a method similar to DE 10 2006 035 081 A1, compactly deposited nonporous poly-Si was broken, classified, chemically cleaned and, packed in PE bags, transported for analysis. Thus, wet chemical cleaning is carried out in the comparative example.

Sample pieces of size 4 were subsequently taken randomly from various PE bags, the dust contamination and metals were measured and an SEM image was taken.

In this case, it is found that all dust values, cf. Table 11, lie at the detection limit. The metal values, cf. Table 10, are significantly lower than in Examples 1 and 2, cf. Table 6.

Table 10 shows the metal values for the Comparative Example in pptw.

TABLE 10

| FS4 | Fe | Cr | Ni | Na | Zn | Al | Cu | Ti | W | K | Co | Mn | Ca | Mg | Sum |
|---|---|---|---|---|---|---|---|---|---|---|---|---|---|---|---|
| #1 | 4 | 0 | 0 | 2 | 0 | 3 | 2 | 7 | 0 | 5 | 1 | 0 | 20 | 1 | 45 |
| #2 | 2 | 3 | 0 | 1 | 0 | 3 | 1 | 2 | 2 | 1 | 2 | 1 | 9 | 1 | 28 |
| #3 | 2 | 0 | 0 | 2 | 2 | 2 | 3 | 3 | 0 | 4 | 1 | 0 | 16 | 2 | 38 |
| #4 | 8 | 1 | 1 | 6 | 1 | 0 | 1 | 4 | 0 | 4 | 0 | 0 | 3 | 7 | 36 |
| #5 | 6 | 0 | 0 | 2 | 1 | 0 | 0 | 10 | 1 | 4 | 0 | 1 | 1 | 1 | 27 |

TABLE 10-continued

| FS4 | Fe | Cr | Ni | Na | Zn | Al | Cu | Ti | W | K | Co | Mn | Ca | Mg | Sum |
|---|---|---|---|---|---|---|---|---|---|---|---|---|---|---|---|
| #6 | 5 | 0 | 1 | 2 | 0 | 1 | 0 | 3 | 1 | 1 | 0 | 1 | 30 | 4 | 50 |
| Average | 4 | 1 | 0 | 2 | 1 | 2 | 1 | 5 | 1 | 3 | 1 | 1 | 13 | 3 | 37 |

Table 11 shows the dust values for the Comparative Example in ppmw.

TABLE 11

| Fraction size | Particle size <1 μm | Particle size <10 μm | Particle size <50 μm | Particle size <400 μm |
|---|---|---|---|---|
| FS0 | 6 | 8 | 17 | 22 |
| FS0 | 2 | 15 | 18 | 20 |
| FS0 | 3 | 2 | 5 | 5 |
| FS0 | 0.5 | 7 | 10 | 11 |
| FS0 | 2 | 12 | 12 | 13 |
| FS1 | 1.0 | 1.5 | 2 | 3 |
| FS1 | 1.4 | 3 | 5 | 7 |
| FS1 | 0.3 | 3 | 4 | 7 |
| FS1 | 2 | 3 | 7 | 17 |
| FS1 | 2 | 4 | 6 | 13 |
| FS1 | | 4 | 6 | 9 |
| FS1 | | 4 | 8 | 9 |
| FS2 | 0.8 | 1.5 | 2 | 4 |
| FS2 | 1.2 | 2 | 3 | 5 |
| FS2 | 0.7 | 1.2 | 2 | 4 |
| FS2 | 1.4 | 3 | 5 | 8 |
| FS2 | 1.3 | 2 | 4 | 7 |
| FS2 | | 2 | 2 | 4 |
| FS3 | 0.7 | 3 | 6 | 10 |
| FS3 | 0.3 | 0.9 | 3 | 4 |
| FS3 | 0.8 | 0.7 | 3 | 6 |
| FS3 | 0.3 | 2 | 7 | 12 |
| FS3 | 1.1 | | | |
| FS4 | 0.5 | 1.2 | 4 | 6 |
| FS4 | 0.3 | 0.5 | 1.3 | 2 |
| FS4 | 0.7 | 1.0 | 3 | 4 |
| FS4 | 0.6 | 2 | 6 | 9 |
| FS4 | 0.2 | 1.1 | 4 | 7 |

It can be seen that significantly better metal values result from wet chemical cleaning than by the method according to the invention.

However, it was the object of the invention to provide particularly economical polycrystalline silicon which can obviate the need for laborious and expensive wet chemical treatment.

The Inventors have discovered that silicon dust is more critical for many applications than contamination with metals, so long as the metal contamination ranges at an acceptable medium level. It has been possible to achieve this by low-contamination processing for particularly demanding applications in combination with a low cleanroom class, and by the dust removal method according to the invention.

The present invention therefore provides significantly more economical polycrystalline silicon having very low dust contents and having metal contamination which is acceptable for many applications.

What is claimed is:

1. A method for producing polycrystalline silicon comprising:
fracturing into fragments polycrystalline silicon deposited on thin rods in a Siemens reactor;
classifying the fragments into classified fragments having size classes of from about 0.5 mm to more than 45 mm; and
treating the classified fragments with compressed air or dry ice to remove silicon dust from the classified fragments without wet chemical cleaning,
wherein at least 90% of the classified fragments have a size from 10 to 40 mm, and the classified fragments contain: (a) less than 15 ppmw of silicon dust particles having particle sizes of less than 400 μm; (b) less than 14 ppmw of silicon dust particles having particle sizes of less than 50 μm; (c) less than 10 ppmw of silicon dust particles having particle sizes of less than 10 μm; (d) less than 3 ppmw of silicon dust particles having particle sizes of less than 1 μm; and (e) surface metal impurities in an amount greater than or equal to 0.1 ppbw and less than or equal to 100 ppbw.

2. A method for producing polycrystalline silicon comprising:
fracturing into fragments polycrystalline silicon deposited on thin rods in a Siemens reactor;
classifying the fragments into classified fragments having size classes of from about 0.5 mm to more than 45 mm; and
treating the classified fragments with compressed air or dry ice to remove silicon dust from the classified fragments without wet chemical cleaning,
wherein at least 90% of the classified fragments have a size from 20 to 60 mm, and the classified fragments contain: (a) less than 15 ppmw of silicon dust particles having particle sizes of less than 400 μm; (b) less than 14 ppmw of silicon dust particles having particle sizes of less than 50 μm; (c) less than 10 ppmw of silicon dust particles having particle sizes of less than 10 μm; (d) less than 3 ppmw of silicon dust particles having particle sizes of less than 1 μm; and (e) surface metal impurities in an amount greater than or equal to 0.1 ppbw and less than or equal to 100 ppbw.

3. A method for producing polycrystalline silicon comprising:
fracturing into fragments polycrystalline silicon deposited on thin rods in a Siemens reactor;
classifying the fragments into classified fragments having size classes of from about 0.5 mm to more than 45 mm; and
treating the classified fragments with compressed air or dry ice to remove silicon dust from the classified fragments without wet chemical cleaning,
wherein at least 90% of the classified fragments have a size greater than 45 mm, and the classified fragments contain: (a) less than 15 ppmw of silicon dust particles having particle sizes of less than 400 μm; (b) less than 14 ppmw of silicon dust particles having particle sizes of less than 50 μm; (c) less than 10 ppmw of silicon dust particles having particle sizes of less than 10 μm; (d) less than 3 ppmw of silicon dust particles having particle sizes of less than 1 μm; and (e) surface metal impurities in an amount greater than or equal to 0.1 ppbw and less than or equal to 100 ppbw.

4. A method for producing polycrystalline silicon comprising:

fracturing into fragments polycrystalline silicon deposited on thin rods in a Siemens reactor;

classifying the fragments into classified fragments having size classes of from about 0.5 mm to more than 45 mm; and treating the classified fragments with compressed air or dry ice to remove silicon dust from the classified fragments without wet chemical cleaning, wherein at least 90% of the classified fragments have a size from 3 to 15 mm, and the classified fragments contain: (a) less than 45 ppmw of silicon dust particles having particle sizes of less than 400 µm; (b) less than 30 ppmw of silicon dust particles having particle sizes of less than 50 µm; (c) less than 20 ppmw of silicon dust particles having particle sizes of less than 10 µm; (d) less than 10 ppmw of silicon dust particles having particle sizes of less than 1 µm; and (e) surface metal impurities in an amount greater than or equal to 0.1 ppbw and less than or equal to 1 ppmw.

5. A method for producing polycrystalline silicon comprising:

fracturing into fragments polycrystalline silicon deposited on thin rods in a Siemens reactor;

classifying the fragments into classified fragments having size classes of from about 0.5 mm to more than 45 mm; and treating the classified fragments with compressed air or dry ice to remove silicon dust from the classified fragments without wet chemical cleaning, wherein at least 90% of the classified fragments have a size from 0.5 to 5 mm, and the classified fragments contain: (a) less than 70 ppmw of silicon dust particles having particle sizes of less than 400 µm; (b) less than 62 ppmw of silicon dust particles having particle sizes of less than 50 µm; (c) less than 60 ppmw of silicon dust particles having particle sizes of less than 10 µm; (d) less than 40 ppmw of silicon dust particles having particle sizes of less than 1 µm; and (e) surface metal impurities in an amount greater than or equal to 0.1 ppbw and less than or equal to 10 ppmw.

6. The method as claimed in any one of claims 1, 2, 3, 4, or 5, wherein the polycrystalline silicon is fractured into fragments with a low-contamination tool, classified and dedusted.

7. The method as claimed in any one of claims 1, 2, 3, 4, or 5, wherein the treating step is conducted at a pressure of from 1 to 50 bar.

8. The method as claimed in any one of claims 1, 2, 3, 4, or 5, wherein the treating step comprises blowing the compressed air or dry ice with a flow speed of at least 2 m/s.

9. The method as claimed in any one of claims 1, 2, 3, 4, or 5, wherein the treating step is conducted for from 0.01 to 2000 seconds.

10. The method as claimed in any one of claim 1, 2, 3, 4 or 5, wherein the surface metal impurities comprise at least one metal selected from the group consisting of Fe, Cr, Ni, Na, Zn, Al, Cu, Mg, Ti, W, K, Co and Ca.

* * * * *